2 Sheets—Sheet 1.

T. C. HARGRAVE.
WHEEL AND AXLE FOR RAILROAD CARS.

No. 81,083.  Patented Aug. 18, 1868.

Witnesses

Inventor

2 Sheets—Sheet 2.

T. C. HARGRAVE.
WHEEL AND AXLE FOR RAILROAD CARS.

No. 81,083. Patented Aug. 18, 1868.

Witnesses

Inventor
Thos. C. Hargrave

UNITED STATES PATENT OFFICE.

THOMAS C. HARGRAVE, OF BOSTON, MASSACHUSETTS.

IMPROVEMENT IN WHEELS AND AXLES FOR RAILROAD-CARS.

Specification forming part of Letters Patent No. 81,083, dated August 18, 1868.

*To all whom it may concern:*

Be it known that I, THOMAS C. HARGRAVE, of Boston, in the county of Suffolk and State of Massachusetts, have invented certain Improvements in the Wheels and Axles of Railroad Cars or Carriages, of which the following is a full, clear, and exact description, reference being had to the accompanying drawings, making part of this specification, in which—

Figure 1:
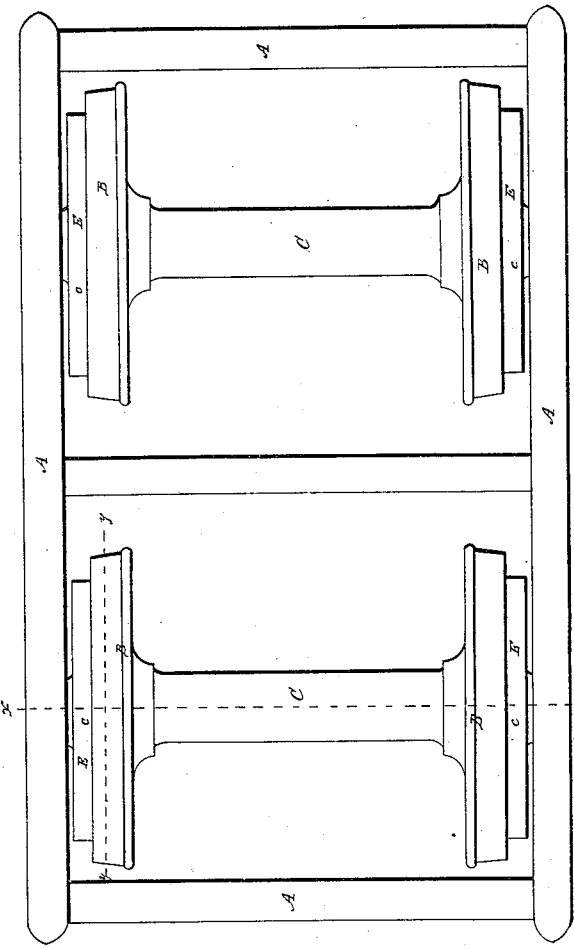
Figure 2:
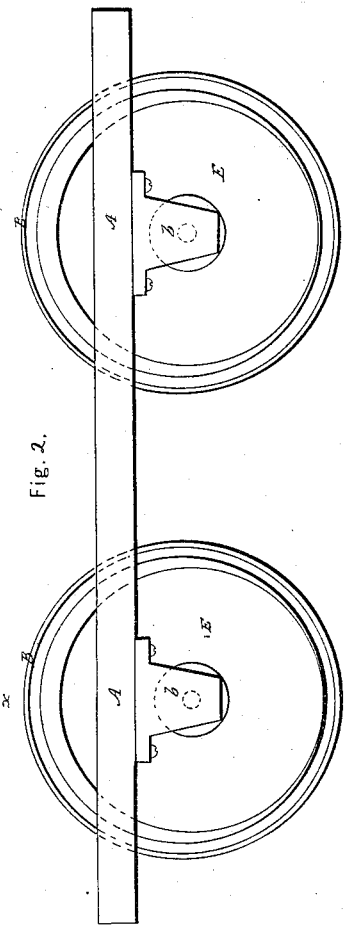
Figure 7:
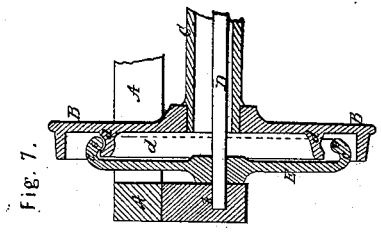
Figure 8:
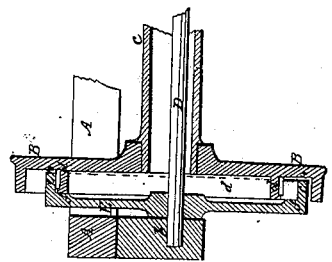
Figure 5:
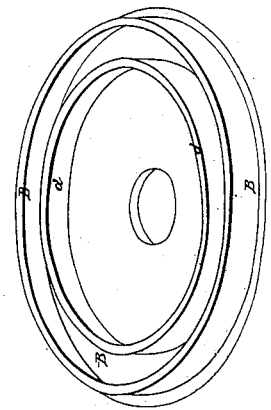
Figure 6:
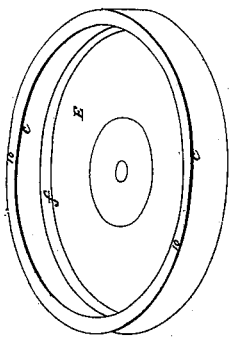
Figure 3:
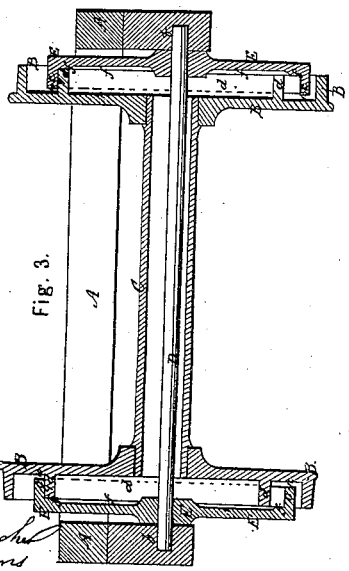
Figure 4:
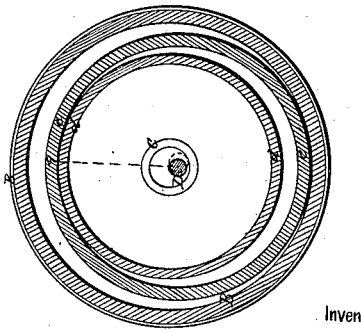

Figure 1 is a plan of the truck and wheels of a railroad-car having my improvements applied thereto. Fig. 2 is a side elevation of the same. Fig. 3 is a vertical section on the line $x\, x$ of Fig. 1. Fig. 4 is a vertical section on the line $y\, y$ of Fig. 1. Figs. 5 and 6, details in perspective. Figs. 7 and 8 are modifications, to be referred to hereinafter.

This invention has for its object to diminish the resistance to the draft of railroad cars or carriages; and consists in a novel means of applying the power to the wheels near to their peripheries, thus increasing the leverage, and reducing in a corresponding degree the amount of power required to move the load.

To enable others skilled in the art to understand and use my invention, I will proceed to describe the manner in which I have carried it out.

In the said drawings, A represents the truck of a railroad-car; B B B B, the wheels, each pair of which is connected together by a hollow axle, C, through which passes an axle, D, the journals of which carry the weight and run in suitable boxes, $b$, secured to the truck A.

E E are two circular plates, which are firmly secured to the ends of the axle D, and are each provided with a flange, $c$, which fits over a flange, $d$, on the outer side of the wheel B. The diameter of the flange $c$ of each plate E is greater than that of the flange $d$, so as to allow of considerable play between the two, the diameter of the axle D being much less than that of the interior of the axle C, so that the former cannot come into contact with the latter.

When the plate E is in place upon the wheel B the flange $c$ touches the flange $d$ at one point, 9, only, as seen in Fig. 4, to which point the weight of the load is transmitted from the axle D through the plate E; and it will thus be seen that the power is applied to the wheel B at this point 9 only, whereby a leverage is obtained equal to the distance from the center of the axle D to the point 9, and the amount of power required to move the load is thus correspondingly diminished.

The difference in the diameters of the plate E and the flange $d$ of the wheel B causes the latter to revolve faster than the former as it rolls around; and, in order to prevent unnecessary friction between the two, the face 10 of the flange $c$ is prevented from bearing against the wheel B by means of a shoulder, $f$, on the inside of the plate E, against which the outer face of the flange $d$ bears. The difference, however, in the diameters of the plate E and the flange $d$ causes the latter to bear against the shoulder $f$ for a short distance only, as seen in Fig. 3, whereby much less friction is created than would be the case if the face 10 of the flange $c$ came into contact with the wheel B.

Other devices may be employed, however, for this purpose, instead of that above described. For instance, the flange $c$ may be curved or turned over, so as to form a lip, $e$, which will fit into a groove in the flange $d$, as seen in Fig. 7, this device also serving to prevent lateral vibration.

On reference to Fig. 4 it will be seen that the weight of the load is suspended from the point 9 in a manner similar to a pendulum, and that the application of the power to the axle D will tend to carry it forward in the line of the draft in advance of the point 9, as shown; and, in order that the load may recover its equilibrium, the center of gravity must advance as the axle continues to be moved forward, the action of the plate E upon the flange $d$ of the wheel B, when the car is in motion, being similar to that exerted by a body in rolling down an inclined plane. This vibration of the truck on the point 9 as a center causes the load to start gradually and easily on the power being applied, and avoids the unpleasant jerking experienced in cars as at present constructed.

If desired, a band of rubber or other elastic substance may be placed around the flange $d$, for the flange $c$ to rest on, as seen in Fig. 8, thus assuring elasticity and additional traction at the point desired.

What I claim as my invention, and desire to secure by Letters Patent, is—

The within-described car-wheel, with its plate and axles, constructed and operating substantially as set forth.

THOS. C. HARGRAVE.

Witnesses:
  P. E. TESCHEMACHER,
  N. W. STEARNS.